(12) United States Patent
Wagner et al.

(10) Patent No.: US 10,272,501 B2
(45) Date of Patent: Apr. 30, 2019

(54) CLAMPING DEVICE FOR TOOLS

(71) Applicant: Michael Weinig AG, Tauberbischofsheim (DE)

(72) Inventors: Ralf Wagner, Hardheim (DE); Sebastian Hofmann, Dammbach (DE)

(73) Assignee: Michael Weinig AG, Tauberbischofsheim (DE)

( * ) Notice: Subject to any disclaimer, the term of this patent is extended or adjusted under 35 U.S.C. 154(b) by 0 days.

(21) Appl. No.: 15/662,600

(22) Filed: Jul. 28, 2017

(65) Prior Publication Data

US 2018/0029138 A1    Feb. 1, 2018

(30) Foreign Application Priority Data

Jul. 29, 2016    (DE) .................. 10 2016 009 431

(51) Int. Cl.
| | |
|---|---|
| *B23B 31/40* | (2006.01) |
| *F16D 19/00* | (2006.01) |
| *B23Q 1/25* | (2006.01) |
| *F16D 7/04* | (2006.01) |
| *F16D 7/10* | (2006.01) |
| *B25B 13/48* | (2006.01) |
| *B25B 23/00* | (2006.01) |

(52) U.S. Cl.
CPC ............ *B23B 31/4073* (2013.01); *B23Q 1/25* (2013.01); *F16D 19/00* (2013.01); *B23B 2231/12* (2013.01); *B23B 2260/044* (2013.01); *B23B 2260/11* (2013.01); *B25B 13/488* (2013.01); *B25B 23/0064* (2013.01); *F16D 7/04* (2013.01); *F16D 7/10* (2013.01); *Y10T 279/33* (2015.01)

(58) Field of Classification Search
CPC .......... B23B 31/4073; B23B 2260/044; B23B 2260/11; B23B 2231/12; B23Q 1/25; F16D 19/00; Y10T 279/33
See application file for complete search history.

(56) References Cited

U.S. PATENT DOCUMENTS

| | | | | |
|---|---|---|---|---|
| 3,795,405 | A | * | 3/1974 | Lecailtel .................. B23B 5/00 269/50 |
| 3,901,519 | A | * | 8/1975 | Lecailtel .................. B23B 5/00 269/50 |
| 4,576,529 | A | * | 3/1986 | Forrer .................. B25B 1/2405 29/560.1 |
| 5,887,860 | A | | 3/1999 | Hong |
| 6,666,804 | B2 | * | 12/2003 | Fabris .................. B21B 27/035 464/184 |

(Continued)

FOREIGN PATENT DOCUMENTS

| | | |
|---|---|---|
| DE | 101 01 093 | 7/2002 |
| GB | 2 378 488 | 2/2003 |
| JP | H0970726 | 3/1997 |

*Primary Examiner* — Eric A Gates
(74) *Attorney, Agent, or Firm* — Gudrun E. Huckett

(57) ABSTRACT

The clamping device is provided for tools and has a coupling piece that is provided with at least one actuating unit. The coupling piece acts to actuate a nut seated on a spindle journal that is receiving the tool. A torque coupling is provided for the nut. The coupling piece is fixedly connected with an output shaft that is in drive connection with a drive shaft by a transmission gear. As a result of the transmission gear, it is possible to rotate the drive shaft with minimal moment in order to apply the great clamping force required for axial clamping of the tool.

12 Claims, 4 Drawing Sheets

(56) References Cited

U.S. PATENT DOCUMENTS

| | | | |
|---|---|---|---|
| 7,331,584 B2* | 2/2008 | Zhang | B23B 31/1238 |
| | | | 279/60 |
| 9,186,729 B2* | 11/2015 | Taglang | B23B 31/16 |
| 9,707,630 B2* | 7/2017 | Lodico | B23B 31/40 |
| 2005/0196247 A1 | 9/2005 | Dawidziak et al. | |
| 2013/0133908 A1* | 5/2013 | Schenk | B23B 45/008 |
| | | | 173/47 |
| 2013/0247706 A1 | 9/2013 | Duerr | |

* cited by examiner

CLAMPING DEVICE FOR TOOLS

BACKGROUND OF THE INVENTION

The invention concerns a clamping device for tools, with a coupling piece that is provided with at least one actuating unit and by means of which a nut on a spindle journal that is receiving the tool is actuatable, and with a torque coupling for the nut.

It is known to axially clamp tools on a spindle journal. For this purpose, a nut is used which is arranged on the spindle journal and with which the tool is axially pressed against a stop provided at the spindle journal. For the clamping process, a clamping device in the form of a combination tool/combination wrench is employed. It has a coupling piece connected to a lever and positioned with form fit on the spindle journal and by means of which the spindle journal can be rotated about its axis. A second lever of the known clamping device is positioned with a hollow bushing/socket sleeve with form fit on the nut. In this way, the nut can be rotated. By the relative rotation of nut and spindle journal, the nut is moved axially against the tool that is axially clamped thereby. The relative rotation of nut and spindle journal is realized by the actuation of the two levers which are projecting away from the coupling or the hollow bushing/socket sleeve. In this context, the user must apply a very great force in order to generate the required axial clamping force. The torque to be applied by the user is within the magnitude of approximately 80 to approximately 100 Nm.

The invention has the object to design the clamping device of the aforementioned kind in such a way that the moment required for axially clamping the tool on the spindle journal can be applied easily.

SUMMARY OF THE INVENTION

In accordance with the invention, this object is solved for the clamping device of the aforementioned kind in that the coupling piece is fixedly connected to an output shaft that is in drive connection with a drive shaft by means of a transmission gear.

In the clamping device according to the invention, the coupling piece is fixedly connected with the output shaft. The latter is drivingly connected by means of the transmission gear with the drive shaft. In this way it is possible that the drive shaft of the clamping device must be rotated only with minimal moment in order to generate the great clamping force required for axially clamping the tool. While in the conventional clamping devices a torque in the range of approximately 80 to 100 Nm is required, a torque of only approximately 2 Nm is required for this purpose in case of the clamping device according to the invention. The transmission gear ensures that the minimal torque to be applied is converted into the great axial clamping force for clamping the tool.

The transmission gear is advantageously a planetary gear that is not only of a compact configuration but also enables a very high gear ratio of, for example, approximately 1:50. The compact configuration of the planetary gear makes it possible to design the clamping device to be handy so that it can be handled by the user without problems.

The transmission gear can also be embodied in a two-stage or multistage configuration so that, depending on the application situation, very high gear ratios can be achieved.

In an advantageous embodiment, the torque coupling is a hollow bushing which is provided with at least one flat portion. By means of it, the hollow bushing is contacting a corresponding flat portion of the nut so that the latter is fixedly connected with the hollow bushing.

The torque coupling surrounds the coupling piece with sufficient clearance so that the rotational movement of the coupling piece during the clamping process is not impaired by the hollow bushing.

In an advantageous embodiment, the actuating unit for rotation of the drive shaft is a handwheel. Because the user must not apply great forces, he can rotate the handwheel easily. Instead of the handwheel, any other suitable actuation unit can be employed also, for example, an electro-motoric drive.

For facilitating rotation, the handwheel is advantageously provided with a handle.

In order to generate upon axial clamping of the tool a defined axial force sufficient for a reliable clamping action but at the same time no clamping force that is too great, it is advantageous when the handwheel is connected by a slip clutch with the drive shaft. As long as the axial clamping force for clamping the tool has not yet been reached, the drive shaft is rotated by the handwheel. When the axial clamping force is reached, the slip clutch ensures that the handwheel rotates relative to the drive shaft and no longer exerts a torque on the drive shaft.

In a preferred embodiment, the slip clutch comprises a hub which is fixedly seated on the drive shaft and against which at least one pressure bolt is resting under spring force. By means of the pressure bolt, the hub and thereby the drive shaft is rotated about its axis when the handwheel is rotated so that the clamping process can be performed.

A reliable torque transmission is achieved in an advantageous way when the pressure bolt is contacting a flat portion on the exterior side of the hub. By means of this flat portion, rotational entrainment of the hub and thus of the drive shaft is realized when the handwheel is rotated about its axis.

In order to achieve proper torque transmission, it is advantageous when the flat portion is formed by the bottom of a recess which is located in the outer wall of the hub.

The spring force which is acting on the pressure bolt is advantageously adjustable. In this way, the torque for clamping the tool can be adjusted.

The recess in the outer wall of the hub forms a boundary wall which is positioned in circumferential direction and against which the pressure bolt will rest when the handwheel must be rotated in opposite direction for release of the axial clamping action. By means of this boundary wall, the full torque can then be transmitted onto the drive shaft without action of the slip clutch so that the tool can be released without problems.

An advantageous and reliably operating configuration results when the pressure bolt is slidably guided in a guide bushing which is accommodated in the handwheel and receives at least one pressure spring with which the pressure bolt is loaded in the direction toward the hub. In the guide bushing, the pressure bolt as well as the pressure spring are thus protected from becoming damaged and/or soiled. Also, by means of the guide bushing it is ensured that the pressure bolt meets the flat portion of the hub with exact alignment.

The force of the pressure spring can advantageously be adjusted continuously when an adjusting screw for the pressure spring is screwed into the guide bushing. It not only holds the pressure spring in the guide bushing but also the spring force can be adjusted easily by means of it and matched to the application situation.

The subject matter of the application not only results from the subject matter of the individual patent claims but also from all specifications and features disclosed in the drawings and the description. Even if they are not subject matter of the claims, they are claimed as being important to the invention insofar as they are novel, individually or in combination, with respect to the prior art.

Further features of the invention result from the additional claims, the description, and the drawings.

BRIEF DESCRIPTION OF THE DRAWINGS

The invention will be explained in more detail with the aid of an embodiment illustrated in the drawings. It is shown in.

DESCRIPTION OF PREFERRED EMBODIMENTS

Figure 4:
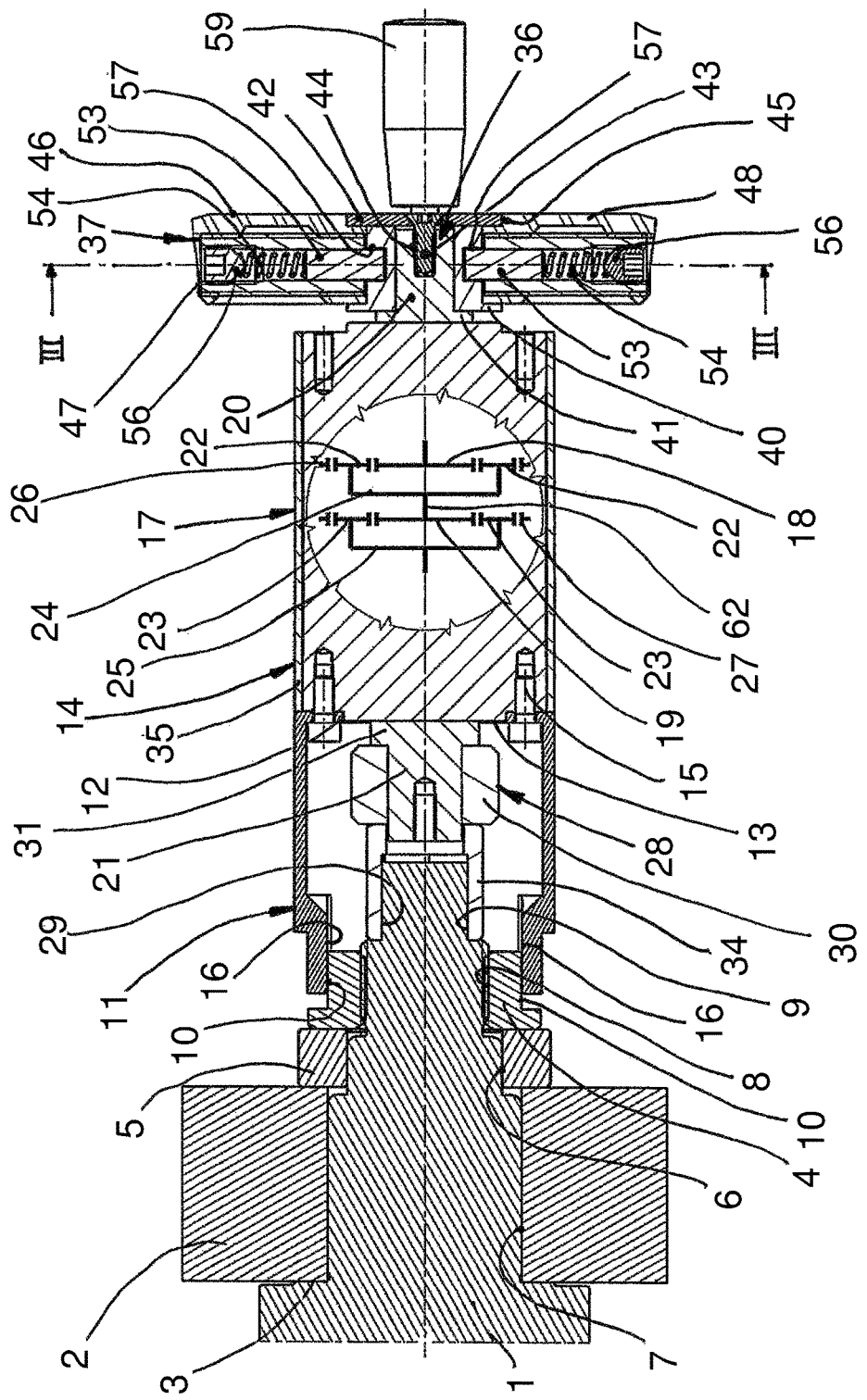
FIG. 4 an axial section of the clamping device according to the invention which is connected to a spindle journal supporting a tool.

As shown in FIG. 4, a tool 2 is seated on a spindle journal 1. The spindle journal 1 forms a tool receptacle on which the tool is axially clamped. For this purpose, the spindle journal 1 is provided with an axial stop 3 against which the tool 2 is resting. The axial stop 3 is formed by a radial shoulder, for example, which is provided on the spindle journal 1. In deviation from the illustrated embodiment, the axial stop for the tool 2 can have any configuration. The tool receptacle is a component of a spindle, for example, a milling spindle, which is rotatably supported in a known manner in a machine housing and is driven motorically. In woodworking machines, in particular moulding machines, workpieces which are in particular comprised of wood, plastic material, and the like are machined by means of the tool 2. The tool 2 can be a profiling tool with which, for example, in moulding machines or on table milling devices, profiles are milled on workpieces, in particular on elongate wooden workpiece. The tool 2 can be, for example, also a planing tool with which the top side of the workpiece is made plane by planing.

The tool 2 is pressed by means of a nut 4 with intermediate positioning of a securing ring 5 against the axial stop 3.

The securing ring 5 is seated on a cylindrical wall surface 6 of the spindle journal 1 which has a smaller diameter in the embodiment than a cylindrical wall surface 7 on which the tool 2 is seated. In order to be able to reliably clamp it axially, the tool 2 is projecting axially in direction toward the securing ring 5 past the wall surface 7. In the same manner, the securing ring 5 also projects axially past the wall surface 6. In a known manner, the securing ring 5 has a form-fit rotary connection with the spindle journal 1, for example, a flat ended key, not illustrated, a groove and tenon connection, or something similar. In this way, it serves as a securing means so that the nut 4 cannot loosen when torque is acting by the tool 2 as a result of cutting forces or inertia forces.

The nut 4 is seated on a threaded section 8 of the spindle journal 1. The threaded section 8 has smaller diameter than the wall surface 6 so that the tool 2 and the securing ring 5 can be mounted.

The spindle journal 1 projects axially past the nut 4 and in this area is provided with an outer polygon 9, for example, a hexagon.

The nut 4 is provided with at least one flat portion 10 on its cylindrical outer side. Advantageously, the nut 4 has 2 diametrically oppositely positioned flat portions 10 or a hexagon on its exterior side.

For clamping the tool 2 between the axial stop 3 and the securing ring 5, an axial clamping force is generated by tightening the nut 4. For this purpose, the clamping device is placed on the nut 4 such that during the clamping process a relative rotation between the nut 4 and the spindle journal 1 takes place. In the embodiment, the nut 4, in a way to be still described, is secured against rotation and the spindle journal 1 is rotated. The clamping device is designed such that the torque required for applying the axial clamping force can be generated easily. In the embodiment, this is realized advantageously by the user of the clamping device himself but can also be applied electro-motorically or by means of another type of energy.

The clamping device has a hollow bushing 11 which at one end is provided with a narrow flange 12 that in radial direction is inwardly oriented (FIG. 4) and with which it is contacting the end face 13 of a gear housing 14. The hollow bushing 11 is detachably connected to the gear housing by means of screws 15, distributed about the circumference of the annular flange 12, so as to rest against the end face 13 of the gear housing 14.

At its free end, the hollow bushing 11 comprises two flat portions 16 that are positioned diametrically opposed to each other and with which the hollow bushing 11 is contacting the flat portions 10 of the nut 4 during clamping of the tool 2. In other respects, the hollow bushing 11 is cylindrically configured.

In the gear housing 14, a transmission gear 17 is accommodated which is only schematically illustrated in FIG. 4. It is advantageously a planetary gear with which a high gear ratio is made possible with a compact configuration. In the illustrated embodiment, a two-stage planetary gear is used. It has the two sun gears 18, 19 which are fixedly seated on a drive shaft 20 or an immediate shaft 62. With the sun gears 18, 19, planetary gears 22, 23 are meshing which are seated on planetary supports 24, 25 and engage ring gears 26, 27 which are provided in fixed position on the inner side of the gear housing 14. The intermediate shaft 62 is a component of the planetary support 24 or is fixedly connected thereto.

The output shaft 21 is a component of the planetary support 25 or fixedly connected thereto.

The drive shaft 20 is in drive connection with the output shaft 21 by means of the transmission gear 17.

The drive shaft 20 as well as the output shaft 21 are rotatably supported in a known manner in the gear housing 14.

The output shaft 21 projects from the gear housing 14 into the hollow bushing 11 which surrounds at a spacing the output shaft 21. On the projecting end of the output shaft 21, a coupling piece 28 is fixedly seated which, for the clamping process, is pushed with an inner polygon 29, preferably a hexagon, on the outer polygon 9 on the free end of the spindle journal 1 (FIG. 4).

Figure 1:
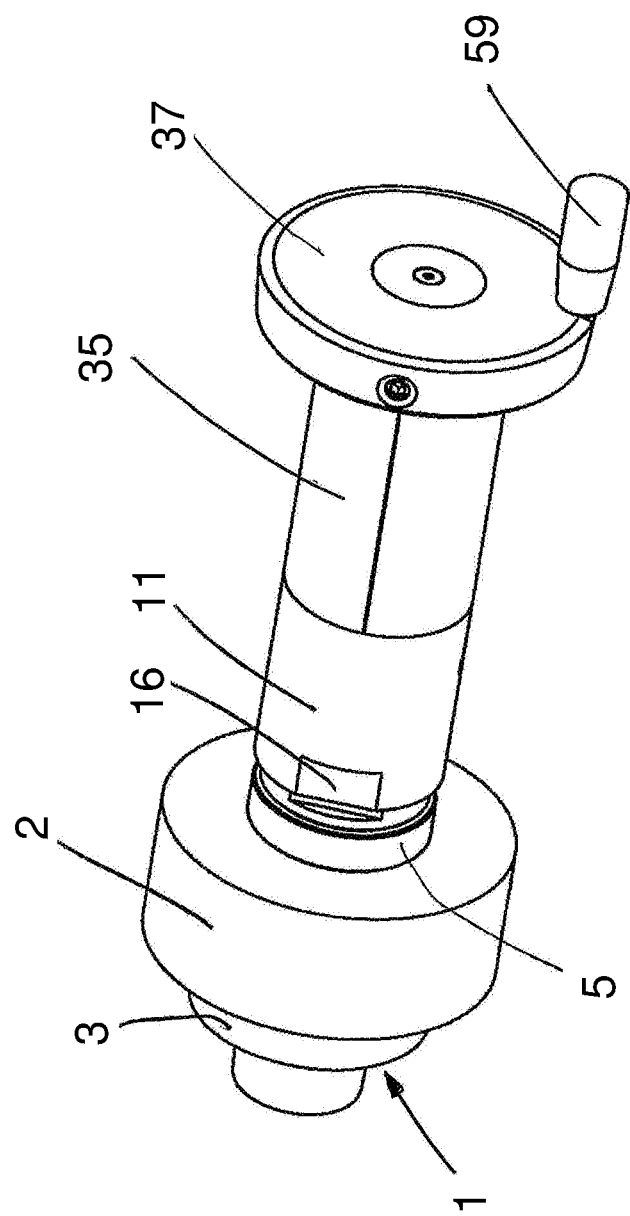
FIG. 1 in perspective illustration a clamping device according to the invention.
Figure 2:
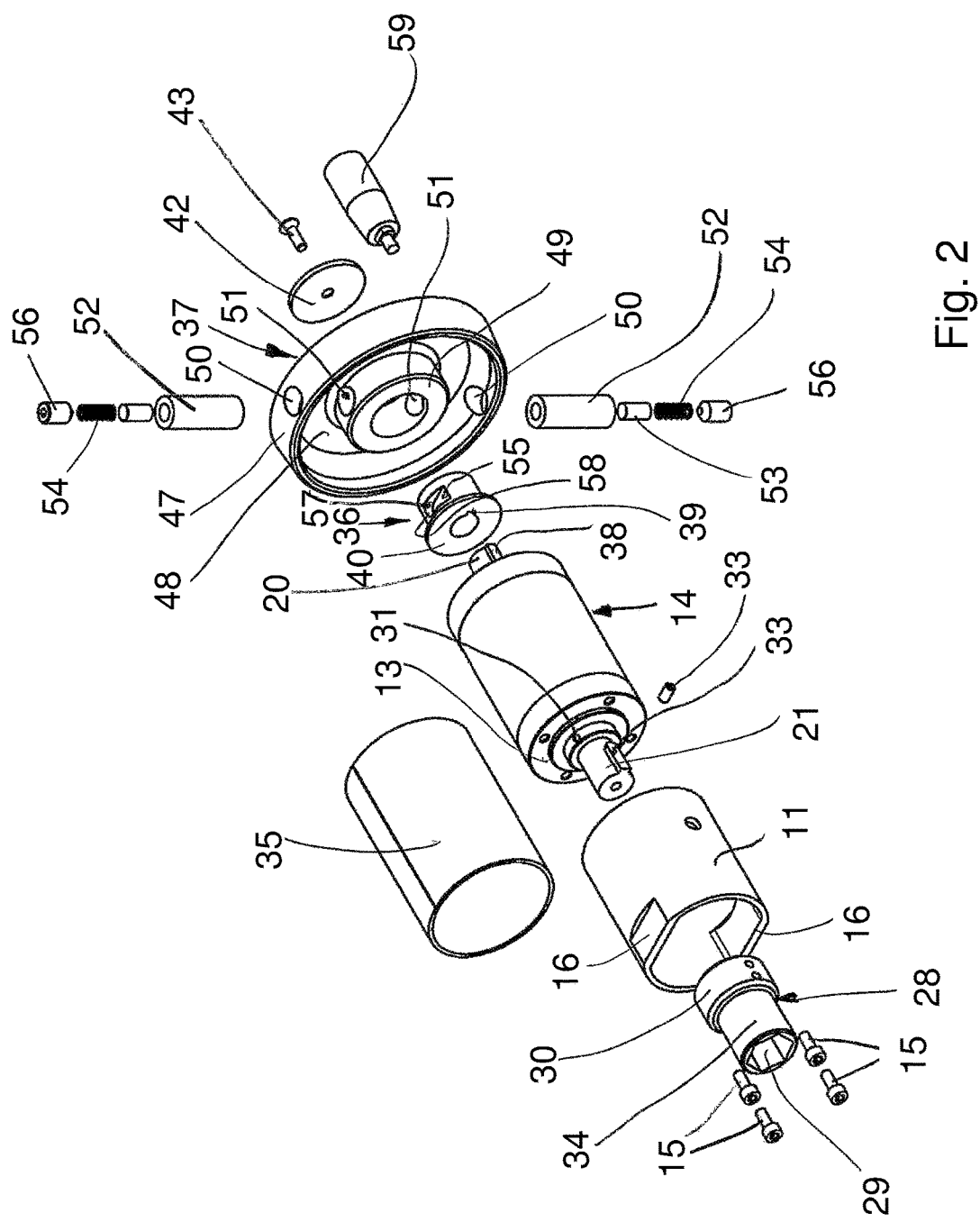
FIG. 2 the clamping device according to the invention in exploded illustration.
Figure 3:
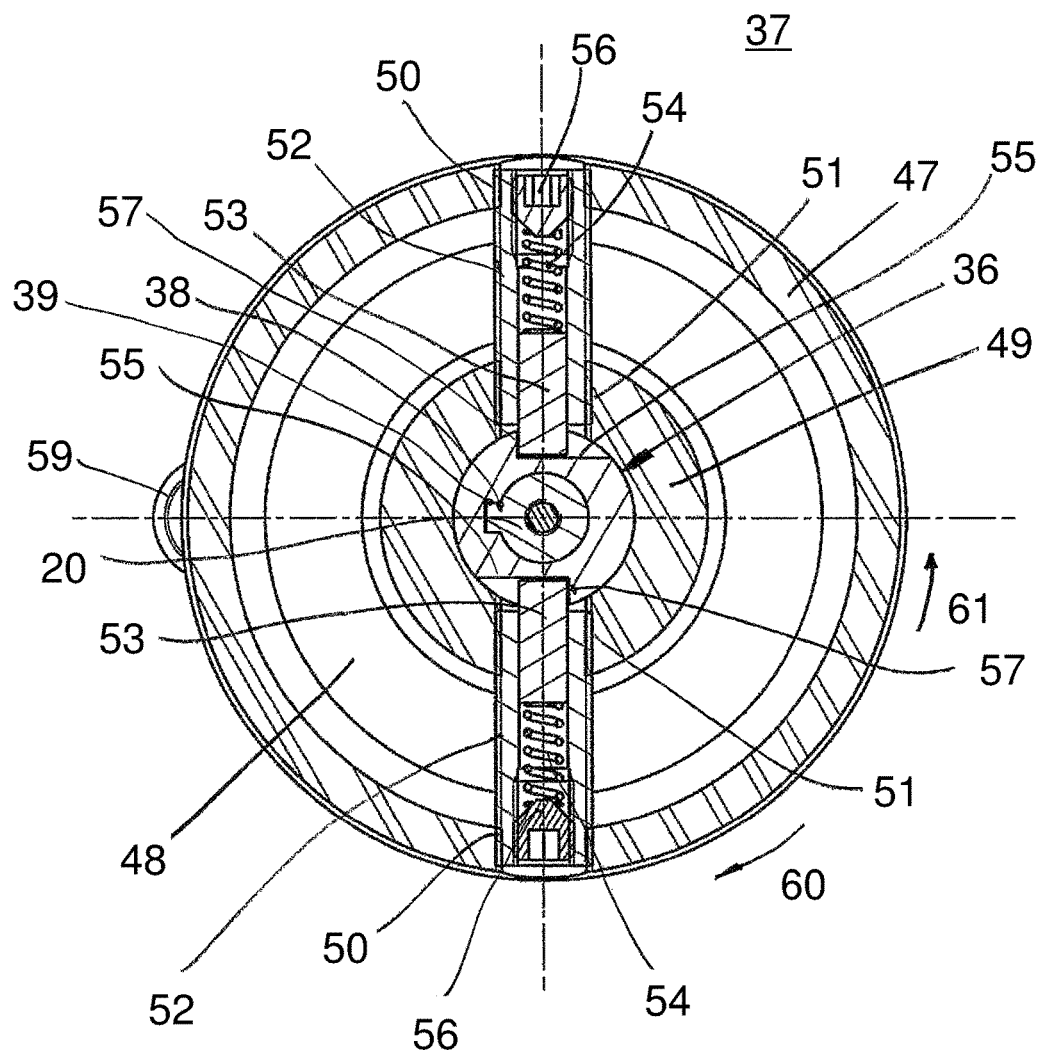
FIG. 3 in enlarged illustration a section along the line III-Ill in FIG. 4.

The coupling piece 28 has at one end a cylindrical ring 30 which is contacting an annular shoulder 31 of the output shaft 21 (FIGS. 2 and 4). The fixed connection between the coupling member 28 and the output shaft 21 is advantageously achieved by a tongue 32 of the output shaft 21 which engages an appropriate axial groove in the inner wall of the ring 30 of the coupling piece 28. The coupling piece 28 is seated, axially secured, on the output shaft 21. For example, the coupling piece 28 can be secured by means of at least one set screw 33 (FIG. 2) on the output shaft 21.

A sleeve 34 adjoins the ring 30 and is provided with an inner polygon 29. The ring 30 and the sleeve 34 are advantageously formed together as one piece but can also be welded together.

The gear housing 14 is advantageously provided with a jacket 35 that is comprised, for example, of cellular rubber and ensures safe handling of the clamping device for the user.

On the end of the drive shaft 20 which is projecting from the gear housing 14, a locking hub 36 is fixedly secured which can be rotated by means of a handwheel 37. According to FIG. 4, the drive shaft 20 and the output shaft 21 project past the oppositely positioned end faces of the gear housing 14.

For fixed connection, the drive shaft 20 is provided with a tongue 38 which engages an appropriate groove 39 on the inner wall of the locking hub 36 (FIG. 2). The locking hub 36 comprises a terminal annular flange 40 which is resting against an annular flange 41 of the drive shaft 20 (FIG. 4).

For axially securing the locking hub 36 on the drive shaft 20, a securing disk 42 is provided which is held by means of a fastening screw 43 on the end face of the drive shaft 20. The fastening screw 43 is screwed into a central end face threaded bore 44 of the drive shaft 20.

The securing disk 42 engages with its rim a recess 45 in the exterior side 46 of the handwheel 37 which is facing away from the gear housing 14. In this way, the handwheel 37 is also axially secured by the securing disk 42. Advantageously, the securing disk 42 is positioned recessed in the recess 45 so that it is not interfering when the handwheel 37 is rotated.

The handwheel 37 has a cylindrical outer wall 47 which is connected with an inner ring 49 that is coaxially extending relative to it by means of a radial bottom 48. The outer wall 47, the bottom 48, and the ring 49 are advantageously formed together as one piece with each other.

The outer wall 47 and the ring 49 are penetrated by a respective opening 50, 51 at two areas that are diametrically opposed to each other. The openings 50, 51 are aligned with each other.

Through the openings 50, 51, a guide bushing 52 is inserted, respectively. The guide bushings 52 can be detachably, but also non-detachably, connected with the handwheel 37. In the embodiment, they are provided with an outer thread and are screwed into appropriate threads of the openings 50, 51. The guide bushings 52 are inserted or screwed in so far that they are not projecting past the exterior side of the wall 47 or the inner side of the ring 49 of the handwheel 37.

In the guide bushings 52, a pressure bolt 53 is guided, respectively, which is contacting the inner wall of the guide bushing 52 and which is loaded in radial direction inwardly by the force of at least one pressure spring 54. The pressure bolt 53 projects in radial direction inwardly past the guide bushing 52 and is positioned with its end face on a flat contact surface 55, respectively, which are provided on the outer side of the locking hub 36 so as to be positioned diametrically opposite each other.

The pressure springs 54 are secured within the guide bushings 52 by an adjusting screw 56 which are screwed into the radial outer end of the guide bushings 52. By means of the adjusting screws 56, the force which is exerted by the pressure spring 54 on the pressure bolt 53 can be adjusted continuously.

The flat contact surfaces 55 form the bottom of recesses 57 which are provided diametrically opposed to each other in the outer wall of the locking hub 36. The contact surfaces 55 are delimited laterally by a side wall 58 that is perpendicularly extending thereto. The width of the recesses 57 is somewhat greater than the diameter of the pressure bolt 53 which is movable thereby in radial direction of the locking hub 36 in the recess 57. The contact surfaces 55 extend all the way to the outer wall of the locking hub 36.

In order to be able to rotate the handwheel 37 easily, it is provided on its exterior side 46 with a handle 59.

In order to clamp the tool 2 axially, the hollow bushing 11 of the clamping device is placed on the nut 4 in such a way that the flat portions 10 of the hollow bushing 11 reach the flat portions 10 of the nut 4. This form-fit fixed torque coupling prevents the nut 4 from rotating relative to the hollow bushing 11 or to the clamping device. During this push-on process, the outer polygon 9 of the spindle journal 1 reaches the inner polygon 29 of the coupling piece 28. This position is illustrated in FIG. 4. By means of the handle 59, the handwheel 37 is rotated in direction of arrow 60 (FIG. 4). By means of the pressure bolt 53, the torque is transmitted from the handwheel 37 through the contact surfaces 55 to the locking hub 36 and thus to the drive shaft 20. By means of the transmission gear 17, the output shaft 21 and thus the coupling member 28 is rotated about its axis. This has the result that the spindle journal 1 is rotated about its axis. Since the nut 4 is connected with form fit to the hollow bushing 11 and the hand-held clamping device for rotation, a relative rotation between nut 4 and spindle journal 1 occurs. Thereby, the nut 4 by means of thread 8 is subjected to an axial movement in the direction toward the tool 2 so that the securing ring 5 is forced against the tool 2. In this way, it is axially clamped between the axial stop 3 and the securing ring 5.

Since the user is keeping hold of the clamping device, the nut 4 is prevented essentially from rotating. For keeping hold, only the minimal torque which is introduced by the handle 59 must be applied also.

In some cases, the spindle journal 1 can be prevented from rotation when, for example, the milling spindle is secured by a motor brake. Then the clamping device rotates together with the nut 4 due to the required relative movement of nut 4 and spindle journal 1b when tightening the nut.

Since the nut 4 is screwed by hand onto the thread 8 of the spindle journal 1 until it is contacting the securing ring 5, the relative rotation is very minimal.

As a result of the transmission gear 17, the user of the clamping device must not apply high forces in order to clamp the tool 2 with the required axial force. The user must only apply a moment of approximately 2 Nm when rotating the handwheel 37 in order to axially clamp the tool 2 to the required degree. The transmission gear, for example, is provided and installed such that the rotary speed of the output shaft is reduced by a ratio of 1:50 in comparison to the drive shaft. In this way, a moment increase in the ratio of 50:1 and thus an output or clamping moment of approximately 100 Nm is achieved. Depending on the required clamping force, the transmission ratio can also deviate from this.

By means of the pressure springs 54, the axial clamping force for the tool 2 can be adjusted very precisely. When the required axial force for clamping the tool 2 is reached, a further rotation of the handwheel 37 causes the pressure bolts 53 to slide on the contact surfaces 55 so far outwardly that they reach the cylindrical outer wall of the locking hub 36. Then no torque is transmitted any longer by the handwheel 37 to the locking hub 36 and thus to the drive shaft 20. The pressure bolts 53 in interaction with the locking hub 36 form thus a type of slip clutch which ensures that the nut 4 is tightened with a defined moment and the tool 2 is thus clamped with a defined axial clamping force.

In order to release the axial clamping action of the tool 2, the handwheel 37 is rotated in release direction 61 (FIG. 4). The pressure bolts 53 are then contacting the part of the sidewall 58 that is transverse to the rotational direction. This position is shown in FIG. 4. In this way, during the release process the full torque of the handwheel 37 is transmitted by means of the pressure bolts 53 to the locking hub 36 or the drive shaft 20, i.e., without the action of the slip clutch. The tool 2 is reliably released in this way.

Instead of the described embodiment, also other types of slip clutches or devices for limiting the torque are possible. Also, different types of gears instead of the described 2-stage planetary gear can be employed.

What is claimed is:

1. A clamping device for axially clamping a tool, disposed on a spindle journal, with a nut, the clamping device comprising:
   a drive shaft and an output shaft;
   a high gear ratio reduction transmission gear operatively connecting the drive shaft permanently to the output shaft to convert minimal torque at the drive shaft to a great clamping force;
   a coupling piece configured to detachably connect with form fit to the spindle journal when connecting the clamping device to the spindle journal and configured to transmit torque from the output shaft to the spindle journal;
   at least one actuating unit connected to the drive shaft;
   a torque coupling configured to detachably connect with form fit to the nut when the clamping device is connected to the spindle journal.

2. The clamping device according to claim 1, wherein the transmission gear is a planetary gear.

3. The clamping device according to claim 1, wherein the torque coupling is a hollow bushing provided with at least one flat portion configured to contact at least one flat portion of the nut.

4. The clamping device according to claim 1, wherein the at least one actuating unit is a handwheel seated on the drive shaft.

5. The clamping device according to claim 4, further comprising a slip clutch connecting the handwheel to the drive shaft.

6. The clamping device according to claim 5, wherein the slip clutch comprises a hub fixedly seated on the drive shaft and further comprises at least one pressure bolt resting under a spring force against the hub.

7. The clamping device according to claim 6, wherein the hub comprises an outer wall with a flat portion and wherein the at least one pressure bolt is resting against the flat portion of the outer wall of the hub.

8. The clamping device according to claim 7, wherein the flat portion of the outer wall of the hub is a bottom of a recess provided in the outer wall of the hub.

9. The clamping device according to claim 8, wherein the spring force is adjustable.

10. A method of clamping a tool on a woodworking machine, the method comprising employing a clamping device according to claim 1 to clamp a tool on a spindle journal of a woodworking machine.

11. A clamping device for a tool, the clamping device comprising:
    a drive shaft and an output shaft;
    a transmission gear operatively connecting the drive shaft to the output shaft;
    a coupling piece fixedly connected to the output shaft and configured to actuate a nut disposed on a spindle journal that is configured to receive a tool;
    at least one actuating unit connected to the coupling piece, wherein the at least one actuating unit is a handwheel seated on the drive shaft;
    a torque coupling configured to act on the nut;
    a slip clutch connecting the handwheel to the drive shaft, wherein the slip clutch comprises a hub fixedly seated on the drive shaft and further comprises at least one pressure bolt resting under a spring force against the hub;
    wherein the slip clutch further comprises a guide bushing disposed in the handwheel and at least one pressure spring disposed in the guide bushing, wherein the at least one pressure bolt is slidably guided in the guide bushing, wherein the at least one pressure spring loads the at least one pressure bolt in a direction toward the hub.

12. The clamping device according to claim 11, wherein the slip clutch further comprises an adjusting screw screwed into the guide bushing and configured to act on the at least one pressure spring.

\* \* \* \* \*